US008109638B2

(12) United States Patent
Chen et al.

(10) Patent No.: US 8,109,638 B2
(45) Date of Patent: Feb. 7, 2012

(54) DIFFUSER CONFIGURATION FOR AN IMAGE PROJECTOR

(75) Inventors: Gang Chen, Basking Ridge, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 949 days.

(21) Appl. No.: 12/017,440

(22) Filed: Jan. 22, 2008

(65) Prior Publication Data

US 2009/0185141 A1 Jul. 23, 2009

(51) Int. Cl.
*G03B 21/14* (2006.01)

(52) U.S. Cl. .............................. 353/31; 353/37; 348/744

(58) Field of Classification Search .................. 353/30, 353/31, 33, 37, 46, 81; 348/744, 752, 756, 348/757
See application file for complete search history.

(56) References Cited

U.S. PATENT DOCUMENTS

| | | |
|---|---|---|
| 3,546,374 A | 12/1970 | Graser, Jr. |
| 3,549,240 A | 12/1970 | Sawatari |
| 3,573,353 A | 4/1971 | Henriques et al. |
| 3,719,127 A | 3/1973 | Mueller |
| 4,281,904 A | 8/1981 | Sprague et al. |
| 4,471,445 A | 9/1984 | Pernick |
| 4,522,466 A | 6/1985 | Lindig et al. |
| 4,834,476 A | 5/1989 | Benton ........................ 350/3.76 |
| 4,986,619 A | 1/1991 | Walker et al. ................. 350/3.61 |
| 5,032,002 A | 7/1991 | Fonneland et al. |
| 5,166,742 A | 11/1992 | Kobayashi et al. |
| 5,172,251 A | 12/1992 | Benton et al. ........................ 359/9 |
| 5,192,946 A | 3/1993 | Thompson et al. |
| 5,239,322 A | 8/1993 | Takanashi et al. .............. 353/31 |
| 5,272,473 A * | 12/1993 | Thompson et al. ................ 345/7 |
| 5,327,270 A | 7/1994 | Miyatake .......................... 349/9 |
| 5,412,674 A | 5/1995 | Scheps |
| 5,440,352 A | 8/1995 | Deter et al. |
| 5,506,597 A | 4/1996 | Thompson et al. .............. 345/85 |
| 5,596,451 A | 1/1997 | Handschy et al. ............. 359/633 |
| 5,617,227 A | 4/1997 | De Bougrenet De La Tocnaye et al. ................................. 349/57 |
| 5,798,819 A | 8/1998 | Hattori et al. ................... 353/33 |
| 5,834,331 A | 11/1998 | Razeghi ........................... 438/40 |
| 6,211,848 B1 | 4/2001 | Plesniak et al. ................... 345/1 |
| 6,250,778 B1 * | 6/2001 | Doumuki ...................... 362/327 |

(Continued)

FOREIGN PATENT DOCUMENTS

EP 1 283 434 A2 2/2003

(Continued)

OTHER PUBLICATIONS

U.S. Appl. No. 11/713,483, filed Mar. 2, 2007, G. Chen, et al.

(Continued)

*Primary Examiner* — John Lee
(74) *Attorney, Agent, or Firm* — Mendelsohn, Drucker & Associates, P.C.; Yuri Gruzdkov; Steve Mendelsohn (57) ABSTRACT

According to one embodiment, an image projector has a spatial light modulator (SLM) adapted to modulate illumination from a laser with a spatial pattern such that the modulated illumination projects an image on a viewing screen. The image projector further has an optical diffuser located on an optical path between the laser and the SLM. The laser is adapted to illuminate the SLM through the optical diffuser to create an illuminated area at the SLM. The optical diffuser is adapted to introduce an angular spread into the light transmitted therethrough. The image projector is adapted to move the illuminated area with respect to the SLM to mitigate speckle in the projected image.

15 Claims, 5 Drawing Sheets

U.S. PATENT DOCUMENTS

| | | | |
|---|---|---|---|
| 6,304,237 B1 | 10/2001 | Karakawa | |
| 6,317,169 B1 | 11/2001 | Smith | |
| 6,323,984 B1 | 11/2001 | Trisnadi | 359/245 |
| 6,426,836 B2 | 7/2002 | Dorsel et al. | 359/443 |
| 6,577,429 B1 | 6/2003 | Kurtz et al. | 359/279 |
| 6,594,090 B2 | 7/2003 | Kruschwitz et al. | 359/707 |
| 6,600,590 B2 | 7/2003 | Roddy et al. | 359/287 |
| 6,621,235 B2 | 9/2003 | Chang | |
| 6,625,381 B2 | 9/2003 | Roddy et al. | 385/147 |
| 6,771,326 B2 | 8/2004 | Flint | |
| 6,791,739 B2 | 9/2004 | Ramanujan et al. | 359/279 |
| 6,797,983 B2 | 9/2004 | Chen et al. | 257/59 |
| 6,870,650 B2* | 3/2005 | Kappel et al. | 359/15 |
| 6,876,484 B2 | 4/2005 | Greywall | 359/291 |
| 6,902,276 B2 | 6/2005 | Glenn | 353/98 |
| 6,906,839 B2 | 6/2005 | Gerchberg | |
| 6,940,577 B2 | 9/2005 | Kozhukh | 349/156 |
| 6,947,459 B2 | 9/2005 | Kurtz et al. | |
| 6,950,454 B2 | 9/2005 | Kruschwitz et al. | |
| 6,984,917 B2 | 1/2006 | Greywall et al. | 310/310 |
| 7,099,063 B2 | 8/2006 | Greywall | 359/290 |
| 7,138,648 B2 | 11/2006 | Kneissl et al. | 257/14 |
| 7,156,522 B2 | 1/2007 | Plut | |
| 7,161,608 B2 | 1/2007 | Pettitt et al. | |
| 7,244,028 B2* | 7/2007 | Govorkov et al. | 353/37 |
| 7,268,852 B2 | 9/2007 | Kuan et al. | 349/165 |
| 7,289,209 B2 | 10/2007 | Kowarz et al. | |
| 7,298,532 B2 | 11/2007 | Thomas et al. | |
| 7,307,786 B2 | 12/2007 | Hatjasalo et al. | 359/569 |
| 7,342,658 B2 | 3/2008 | Kowarz et al. | |
| 7,355,657 B2* | 4/2008 | Chilla et al. | 348/744 |
| 7,413,311 B2* | 8/2008 | Govorkov et al. | 353/34 |
| 7,423,808 B2* | 9/2008 | Lee | 359/457 |
| 7,481,541 B2 | 1/2009 | Maximus et al. | |
| 7,492,948 B2 | 2/2009 | Gluckstad | |
| 7,502,160 B2 | 3/2009 | Aksyuk et al. | 359/290 |
| 7,595,622 B1 | 9/2009 | Tomiyoshi et al. | |
| 7,646,518 B2* | 1/2010 | Kasazumi | 359/196.1 |
| 7,782,521 B2* | 8/2010 | Khan et al. | 359/290 |
| 7,843,150 B2 | 11/2010 | Wang et al. | |
| 2001/0019434 A1 | 9/2001 | Popovich et al. | |
| 2001/0022613 A1 | 9/2001 | Matsui et al. | |
| 2002/0034710 A1 | 3/2002 | Morris et al. | 430/321 |
| 2003/0025842 A1 | 2/2003 | Saccomanno | |
| 2003/0039036 A1* | 2/2003 | Kruschwitz et al. | 359/707 |
| 2003/0165013 A1 | 9/2003 | Doany et al. | 359/485 |
| 2003/0218794 A1 | 11/2003 | Takeda et al. | |
| 2004/0008392 A1* | 1/2004 | Kappel et al. | 359/15 |
| 2004/0213515 A1 | 10/2004 | Pezeshki et al. | |
| 2004/0239880 A1 | 12/2004 | Kapellner et al. | 353/20 |
| 2004/0263802 A1 | 12/2004 | Seki et al. | |
| 2005/0013005 A1 | 1/2005 | Rogers | |
| 2005/0147135 A1 | 7/2005 | Kurtz et al. | |
| 2005/0219675 A1 | 10/2005 | Aksyuk et al. | 359/224 |
| 2005/0243282 A1 | 11/2005 | Peterson et al. | |
| 2005/0253055 A1 | 11/2005 | Sprague et al. | |
| 2006/0018025 A1 | 1/2006 | Sharon et al. | |
| 2006/0028961 A1 | 2/2006 | Kim et al. | 369/112.01 |
| 2006/0066964 A1 | 3/2006 | Greywall | 359/849 |
| 2006/0109386 A1* | 5/2006 | Serafimovich et al. | 348/744 |
| 2006/0109553 A1* | 5/2006 | Serafimovich et al. | 359/565 |
| 2006/0126022 A1* | 6/2006 | Govorkov et al. | 353/31 |
| 2006/0126151 A1 | 6/2006 | Aksyuk et al. | 359/291 |
| 2006/0175622 A1 | 8/2006 | Richards et al. | |
| 2006/0181770 A1* | 8/2006 | Lee | 359/460 |
| 2006/0227440 A1 | 10/2006 | Gluckstad | |
| 2006/0267449 A1 | 11/2006 | Aksyuk et al. | 310/309 |
| 2007/0024213 A1 | 2/2007 | Shteynberg et al. | |
| 2007/0046907 A1 | 3/2007 | Shin | 353/119 |
| 2007/0070296 A1 | 3/2007 | Iwanaga | |
| 2007/0070302 A1* | 3/2007 | Govorkov et al. | 353/94 |
| 2007/0153378 A1* | 7/2007 | Lee | 359/460 |
| 2007/0153866 A1 | 7/2007 | Shchegrov et al. | |
| 2007/0216982 A1 | 9/2007 | Sanders et al. | |
| 2007/0251916 A1* | 11/2007 | Akahane et al. | 216/27 |
| 2007/0257623 A1 | 11/2007 | Johnson et al. | |
| 2007/0262724 A1 | 11/2007 | Mednik et al. | |
| 2007/0279731 A1 | 12/2007 | Blumberg | 359/291 |
| 2008/0116818 A1 | 5/2008 | Shteynberg et al. | |
| 2008/0158513 A1* | 7/2008 | Bartlett et al. | 353/30 |
| 2008/0212034 A1* | 9/2008 | Aksyuk et al. | 353/20 |
| 2008/0212159 A1 | 9/2008 | Giles et al. | 359/238 |
| 2008/0297128 A1 | 12/2008 | Xu et al. | |
| 2009/0096999 A1* | 4/2009 | Frahm et al. | 353/101 |
| 2009/0153579 A1* | 6/2009 | Ichikawa et al. | 345/589 |
| 2009/0158140 A1 | 6/2009 | Bauchot et al. | |
| 2009/0184976 A1 | 7/2009 | Chen et al. | |
| 2009/0185141 A1* | 7/2009 | Chen et al. | 353/38 |
| 2009/0191489 A1* | 7/2009 | Sandstrom | 430/321 |
| 2009/0310087 A1* | 12/2009 | Itoh et al. | 353/38 |

FOREIGN PATENT DOCUMENTS

| | | |
|---|---|---|
| EP | 1 292 134 A2 | 3/2003 |
| EP | 1 703 318 A1 | 9/2006 |
| EP | 1 734 771 A1 | 12/2006 |
| EP | 1 750 441 A2 | 2/2007 |
| JP | 2002-131689 A | 5/2002 |
| WO | WO 2004/064410 A1 | 7/2004 |
| WO | WO 2006104704 A1 | 10/2006 |
| WO | WO 2007/024503 A1 | 3/2007 |
| WO | WO2007/072335 A2 | 6/2007 |
| WO | WO 2008108947 A1 | 9/2008 |
| WO | WO 2009/040822 A2 | 4/2009 |
| WO | WO 2010/023444 A1 | 3/2010 |

OTHER PUBLICATIONS

U.S. Appl. No. 11/713,207, filed Mar. 2, 2007, R. Giles, et al.

U.S. Appl. No. 11/713,155, filed Mar. 2, 2007, V. Aksyuk, et al.

"PVPro Enabling personal video projectors", Light Blue Optics Ltd., available online at: www.lightblueoptics.com, (2006) 5 pages.

R.W.Gerchberg and W.O. Saxton, "Phase Determination from Image and Diffraction Plane Pictures in the Electron Microscope", OPTIK, vol. 34, No. 3 (1971), pp. 275-284.

R.W. Gerchberg and W.O. Saxton, "A Practical Algorithm for the Determination of Phase from Image and Diffraction Plane Pictures" OPTIK, vol. 35, No. 2 (1972), pp. 237-246.

"A Tail of Two Cats", published on line at: http://www.ysbl.york.ac.uk/~cowtan/fourier/coeff.html, Dec. 15, 2006, 3 pages.

K. Greene, "Pocket Projectors" published on line at: http://www.technologyreview.com/BizTech/17860/, Technology Review, Dec. 6, 2006, 3 pages.

K. Greene, "Ultra-Colorful TV" published online at: http://www.technologyreview.com/read_article.aspx?id=17651&ch=infotech&sc=&pg=2, Technology Review, Oct. 24, 2006, pp. 1-4.

Lucente, Mark, "Diffraction-Specific Fringe Computation for Electro-Holography,"Ph.D Thesis, Dept. of Electrical Engineering and Computer Science, Massachusetts, Institute of Technology, available online at http://www.lucente.biz/pubs/PhDthesis/contents.html, Sep. 1994, abstract, table of contents, and pp. 13-174.

R. W. Gerchberg, "Super-resolution through error energy reduction", Optica Acta, 1974, vol. 21, No. 9, pp. 709-720.

"Novalux Delivers High-Power, Blue, Solid-State Light Sources to Consumer Electronics Partners", published on line at: http://novalux.com/company/press.php?release=5, Nov. 7, 2005, 2 pages.

"Single and Dual Panel LC Projection Systems," by M. G. Robinson, J. Chen, G. D. Sharp, Wiley, Chichester (England), 2005, Chapter 11, pp. 257-275.

U.S. Appl. No. 11/681,376, filed Mar. 2, 2007, V. Aksyuk, et al.

U.S. Appl. No. 12/017,984, filed Jan. 22, 2008, Gang Chen, et al.

U.S. Appl. No. 12/009,991, filed Jan. 22, 2008, Gang Chen, et al.

U.S. Appl. No. 12/009,851, filed Jan. 22, 2008, Gang Chen, et al.

U.S. Appl. No. 11/765,155, filed Jun. 19, 2007, Roland Ryf.

"DC-DC Converter Basics" published on line at: http://www.powerdesigners.com/InfoWeb/design_center/articles/DC-DC/converter.shtm, 12 pages, (1998).

Moulton et al., "High-Powered RGB Laser Source for Displays," presented at the IMAGE 2002 Conference, Scottsdale, AZ Jul. 8-12, 2002, 4 pp.

"Presentation Industry's First Texas Instruments Digital Light Processing Technology Projector with DCDi for Color Critical and Home Theater Applications," Dec. 18, 2001, downloaded from http://www.hcinema.de/pdf/presse/mitsubishixd200-press-en.pdf 2 pp.

Fienup, J.R., "Reconstruction of an object from the modulus of its Fourier transform," Optics Letters, vol. 3, No. 1, pp. 27-29, Jul. 1978.

Fienup, J.R. "Phase retrieval algorithms: a comparison." Applied Optics, vol. 21, No. 15, pp. 2758-2769, Aug. 1, 1982.

Zalevsky, Z. et al., "Gerchberg-Saxton algorithm applied in the fractional Fourier or the Fresnel domain," Optics Letters, vol. 21, No. 12, pp. 842-844, Jun. 15, 1996.

Watson, G.P. et al., "Comparison of tilting and piston mirror elements for 65 nm mode spatial light modulator optical maskless lithography," J. Vac. Technol., vol. B 22, No. 6, pp. 3038-3042, Nov./Dec. 2004.

"Study of a New Ytterbium Doped Phosphate Laser Glass," by Dai Shixun et al., Chinese Science Bulletin, vol. 47, No. 3, Feb. 2002, pp. 255-259.

"A Tunable, Short, (5cm) Glass Fiber Laser for Helium Optical Pumping," by L.D. Schearer et al, Journal De Physique IV, Article published online by EDP Sciences and available at http://dx.doi.org/10.1051/jp4:1991787, 4 pages.

"Spectrum Stability of a Broadband 1060nm Nd-Doped Fibre Laser," Electronics Letters, vol. 26, No. 13, Jun. 21, 1990, 3 pages.

"Efficient Second Harmonic Generation of Femtosecond Laser at 1 μm," by Heyuan Zhu et al., May 17, 2004, vol. 12, No. 10, Optics Express 2150, 6 pages.

"Perceived Speckle Reduction in Projection Display Systems" by Kerigan, SC et al., IP.com Journal, IP.com Inc., IP.com No. IPCOM000118774D; West Henrietta, NY, Jul. 1, 1997, XP-013106711.

"Some Fundamental Properties of Speckle" by J.W. Goodman, Journal of the Optical Society of America, American Institute of Physics, New York, vol. 66, No. 11, Nov. 1, 1976, pp. 1145-1150, XP-002181682.

* cited by examiner

DIFFUSER CONFIGURATION FOR AN IMAGE PROJECTOR

CROSS-REFERENCE TO RELATED APPLICATIONS

The subject matter of this application is related to that of: (1) U.S. patent application Ser. No. 12/017,984 by Gang Chen and Roland Ryf, entitled "System and Method for Color-Compensating a Video Signal Having Reduced Computational Requirements;" (2) U.S. patent application Ser. No. 12/009,991 by Gang Chen and Roland Ryf, entitled "Multi-Color Light Source;" and (3) U.S. patent application Ser. No. 12/009,851 by Gang Chen, David A. Duque, and Roland Ryf, entitled "Time Division Multiplexing a DC-to-DC Voltage Converter," all of which are filed on the same date as the present application and each of which is incorporated herein by reference in its entirety.

BACKGROUND OF THE INVENTION

1. Field of the Invention

The present invention relates to image projectors and hand-held electronic devices.

2. Description of the Related Art

This section introduces aspects that may help facilitate a better understanding of the invention(s). Accordingly, the statements of this section are to be read in this light and are not to be understood as admissions about what is in the prior art and/or what is not in the prior art.

A projector is a device that integrates a light source, optics, electronics, and a light-modulating element for the purpose of projecting an image or a sequence of images, e.g., from a computer or video input, onto a wall or screen for large-image viewing. There are many projectors available in the market, and they are differentiated by their size, resolution, performance, and other features. Some projectors employ laser light sources because the use of lasers enables creation of vibrant images with extensive color coverage that might be difficult to achieve with other (non-laser) light sources. However, one significant obstacle to laser image projection is the speckle phenomenon that tends to superimpose a granular structure on the perceived image. Since speckle both degrades the image sharpness and annoys the viewer, speckle reduction is highly desirable.

SUMMARY OF THE INVENTION

According to one embodiment, an image projector has a spatial light modulator (SLM) having a plurality of pixels adapted to modulate a received illumination light beam with a spatial pattern to form said image. The image projector further has an optical diffuser located along an optical path between a laser and the SLM and adapted to transmit light generated by the laser to produce said illumination light beam at the SLM so that, at each pixel of the plurality, the illumination light beam has light rays corresponding to a range of incident angles. The optical device is adapted to move the illumination light beam across the SLM. At each pixel of the plurality, said motion of the illumination light beam changes relative optical phases of the light rays having different incident angles.

According to another embodiment, an image projector has an SLM adapted to modulate a coherent illumination beam with a spatial pattern. The image projector further has an optical diffuser located along an optical path that said coherent illumination beam follows prior to being intercepted by the SLM. The optical diffuser is adapted to introduce one angular spread into light transmitted therethrough along a first direction and a different angular spread into said transmitted light along a different second direction. The optical diffuser is adapted to move with respect to a surface of the SLM.

According to yet another embodiment, a method of projecting an image on a viewing screen has the steps of: (A) with a laser, illuminating a portion of a surface of an SLM by passing a light beam through an optical diffuser, wherein the optical diffuser is adapted to angularly spread the light beam incident thereon so that, at each pixel of the plurality, the illuminating light beam has light rays corresponding to a range of incident angles; (B) modulating said illuminating light beam with a spatial pattern displayed by a plurality of pixels of the SLM to form said image; and (C) moving the illuminating light beam across the SLM, wherein, at each pixel of the plurality, said motion changes relative optical phases of the light rays having different incident angles.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

A compact image projector, e.g., one that can be incorporated into a cell phone and used to project a relatively large image on a wall or an 8.5"×11" sheet of paper, may be of interest to electronic-equipment manufacturers. While the compactness of modern hand-held electronic devices is advantageous for portability purposes, their relatively small size creates an inherent disadvantage with respect to the display of visual information. More specifically, the display screen of a cell phone, personal digital assistant (PDA), or portable media player is typically too small to present most documents in their original full-page format and/or graphics and video content at their original resolution. Having a compact image projector instead of or in addition to a regular display screen in a hand-held electronic device would enable the user to display and view such visual information in a more appropriate form.

In laser image projectors, speckle reduction is generally based on averaging two or more independent speckle configurations within the spatial and/or temporal resolution of the detector, such as the human eye. For the human eye, the averaging time can be deduced from a physiological parameter called the flicker fusion threshold or flicker fusion rate. More specifically, light that is pulsating at a rate lower than the flicker fusion rate is perceived by humans as flickering. In contrast, light that is pulsating at a rate higher than the flicker fusion rate is perceived as being constant in time. Flicker fusion rates vary from person to person and also depend on the individual's level of fatigue, the brightness of the light source, and the area of the retina that is being used to observe the light source. Nevertheless, very few people perceive flicker at a rate higher than about 75 Hz. Indeed, in cinema and television, frame delivery rates are between 20 and 60 Hz, and 30 Hz, is normally used. For the overwhelming majority of people, these rates are higher than their flicker fusion rate.

Independent speckle configurations may be produced using diversification of phase, propagation angle, polarization, and/or wavelength of the illuminating laser beam. One approach to achieving angle diversity is the use of a time-varying (e.g., vibrating) diffuser. However, time-varying diffusers tend to have physical sizes that are too large to be desirable for use in small hand-held projectors. It is therefore desirable to have a diffuser configuration amenable to use in small hand-held projection devices.

Figure 1:
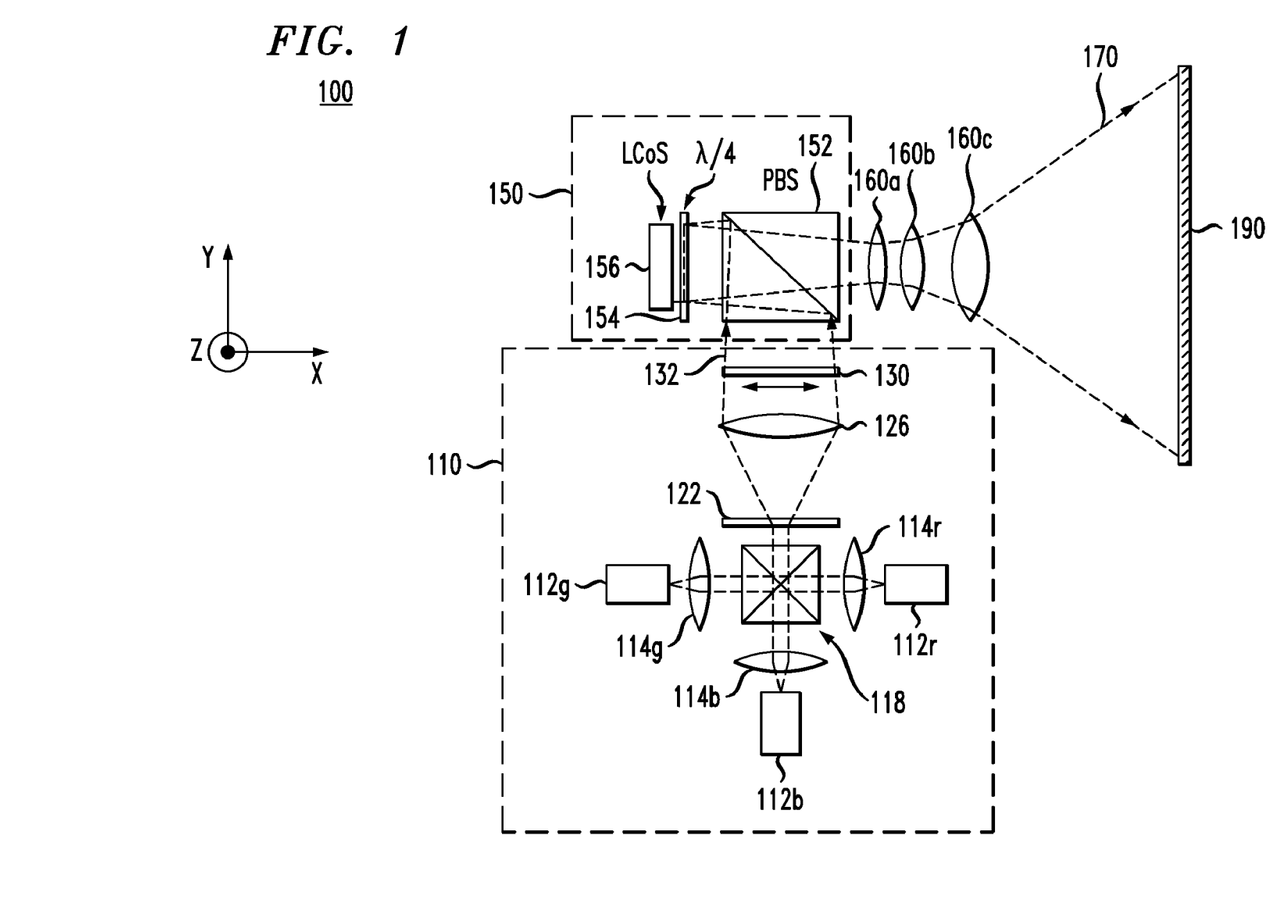
FIG. 1 shows a top view of a projector according to one embodiment of the invention.

FIG. 1 shows a top view of a projector 100 according to one embodiment of the invention. Projector 100 has a light source 110 adapted to feed multi-colored light (e.g., red, green, and blue) into a modulator section 150. Modulator section 150 generates a spatially intensity-modulated beam 170 that, after passing through a projection lens 160, forms a color image on a screen 190. Although, in FIG. 1, projection lens 160 is illustratively shown as a compound lens having three lenses 160a-c, other types of projection lenses can similarly be used.

Light source 110 has a set of three lasers 112r, 112g, and 112b, each adapted to generate pulsed light of a designated color, e.g., red, green, and blue, respectively. The optical beams generated by the lasers substantially are in a plane parallel to the XY plane of FIG. 1. Each of the optical beams generated by lasers 112r, 112g, and 112b is a diverging beam that is collimated by a corresponding lens 114 placed in front of the laser. Lasers 112r, 112g, and 112b are synchronized so that modulator section 150 receives a periodic train of pulses. For example, each illumination period may have three or more sequential pulses of different colors, wherein the pulses appear at a selected repetition rate. The above-cited U.S. patent application Ser. No. 12/009,991 by Gang Chen and Roland Ryf, describes various methods of time multiplexing light pulses of various colors suitable for use in light source 110.

A color combiner (also often referred to as an X-cube) 118 (re)directs the collimated optical beams received from lenses 114r, 114g, and 114b toward an optical arrangement composed of a first optical diffuser 122, a collimation/condenser lens 126, and a second optical diffuser 130 whose respective optical functions are described in more detail below. In FIG. 1, light source 110 is shown as having optical diffuser 130 located downstream from lens 126. In an alternative embodiment, optical diffuser 130 can be placed upstream from lens 126. Light source 110 may further incorporate a polarizer or other birefringent element (not explicitly shown) that serves to adjust, if necessary, the polarization of output beam 132 to enable proper operation of modulator section 150.

Modulator section 150 has a liquid-crystal-on-silicon (LCOS) spatial light modulator (SLM) 156 optically coupled to a polarization beam splitter (PBS) 152 and a quarter-wave (λ/4) plate 154. A representative LCOS SLM that can be used as SLM 156 is described, e.g., in "Polarization Engineering for LCD Projection," by M. G. Robinson, J. Chen, G. D. Sharp, Wiley, Chichester (England), 2005, Chapter 11, pages 257-275, the teachings of which are incorporated herein by reference in their entirety. LCOS SLMs that can be adapted for use as SLM 156 are also disclosed, e.g., in U.S. Pat. Nos. 7,268,852, 6,940,577, and 6,797,983, all of which are incorporated herein by reference in their entirety. A suitable LCOS SLM that can be used as SLM 156 is manufactured by JVC Corporation and is commercially available as part of JVC Projector Model DLA-HD2K.

PBS 152 is oriented with respect to the polarization of beam 132 so as to redirect substantially all light of that beam towards SLM 156. Quarter-wave plate 154 is a birefringent plate that produces a retardation of about one quarter of a wavelength between two orthogonal linear polarization components of an optical beam normally passing therethrough. Normally traversing quarter-wave plate 154 two times causes the light directed to SLM 156 and then reflected from the SLM (from the pixels that are in the ON state) to acquire the polarization needed to be transmitted by PBS 152. That is, the polarization of such reflected light is such that PBS 152 transmits such light without substantially reflecting the light back toward light source 110. After being transmitted through PBS 152, the spatially modulated light reflected from SLM 156 and shaped by lens 160 forms output beam 170.

Each reflection pattern displayed by the ON-state pixels of SLM 156 represents an image to be projected onto screen 190, and the SLM can display a new reflection pattern for each laser pulse. In effect, projection lens 160 images the reflection pattern displayed by SLM 156 onto screen 190. If the pulse repetition rate is sufficiently high (e.g., greater than the flicker fusion rate), then the images corresponding to the three different colors are fused by the human eye, thereby creating a perceived color image.

Optical diffuser 122 is adapted to act as a beam shaper. Laser 112 typically emits a cone of light having a generally circular or oval cross section, whereas SLM 156 typically has a generally rectangular active area (i.e., the area that contains reconfigurable pixels) suitable for displaying rectangular images. Accordingly, optical diffuser 122 transforms a beam having a generally circular or oval cross section into a beam having a generally rectangular cross section of a shape corresponding to that of the active area of SLM 156. U.S. Pat. No. 7,307,786, which is incorporated herein by reference in its entirety, discloses how to make and use an optical diffuser that can serve as optical diffuser 122. In various embodiments, various optical diffusers selected from those commercially available from RPC Photonics, Inc., of Rochester, N.Y., USA, can be used as optical diffuser 122.

While performing the beam shaping, optical diffuser 122 alters the angular divergence of the optical beam transmitted therethrough. More specifically, optical diffuser 122 converts the substantially collimated beam received from color combiner 118 into a diverging beam, e.g., as indicated by the corresponding dotted lines in FIG. 1. Lens 126 is configured to substantially re-collimate that diverging beam and direct the resulting collimated beam toward optical diffuser 130.

Optical diffuser 130 is adapted to perform at least two optical functions: (1) to act as a spatial intensity homogenizer and (2) to impose a specified angular distribution onto the collimated beam received from lens 126. Referring to the first function of optical diffuser 130, the light applied to optical diffuser 130 typically has various intensity non-uniformities mostly because the beam of light emitted by laser 112 has a non-uniform intensity distribution, such as bright spots and/or variously shaped stripes, with more light being concentrated near the center axis of the beam than near its periphery. However, projected images of high quality are typically obtained if SLM 156 is placed under generally uniform illumination or substantially uniform intensity distribution over its active area. Accordingly, optical diffuser 130 transforms the non-uniform light-intensity distribution into a substantially uniform one.

Referring to the second function of optical diffuser 130, in one embodiment, that optical diffuser comprises an optically transparent plate having a relatively complex micro-structured surface. If a collimated beam impinges onto optical diffuser 130, then different portions of the surface change the propagation direction of the corresponding portions of the collimated beam by respective different amounts, thereby creating a corresponding angular distribution in the beam produced by the optical diffuser. This angular distribution defines a range of angles at which each pixel of SLM 156 receives light from light source 110 and produces incident-angle diversity at the SLM. In various embodiments, optical diffuser 130 can be designed to produce an angular distribution width that ranges from about 2 degrees to about 10 degrees. U.S. Patent Application No. 20020034710, which is incorporated herein by reference in its entirety, discloses how to make and use an optical diffuser that can serve as optical diffuser 130. In various embodiments, various optical diffusers selected from those commercially available from RPC Photonics, Inc., of Rochester, N.Y., USA, can be used as optical diffuser 130.

When optical elements in projector 100 are temporally stationary (not moving with respect to one another), a pixel of SLM 156 receives illumination characterized by a certain phase relationship between the light rays having different incident angles. However, this phase relationship changes as a function of the pixel's position with respect to optical diffuser 130. Projector 100 is designed to exploit this relative phase variation to produce speckle reduction in the projected image.

In one embodiment, optical diffuser 130 is adapted to move, e.g., oscillate along the X axis as indicated by the double-headed arrow in FIG. 1. At a given pixel of SLM 156, this motion of optical diffuser 130 imposes an oscillatory temporal modulation on the relative phases of the light rays having different incident angles without substantially changing the range of angles at which the light is being received at the pixel. If the frequency of this oscillatory modulation is sufficiently high, e.g., higher than the flicker fusion rate, then the appearance of speckle in the projected image can be reduced because the modulation is able to reduce (or preferably destroy) the spatial coherence of light received at the pixel and suppress the interference effects that give rise to speckle.

One skilled in the art will appreciate that other types of periodic or non-periodic motion of optical diffuser 130 can also reduce speckle in the projected image. For example, optical diffuser 130 can be configured to move along a planar trajectory that is parallel to the XZ plane. The planar trajectory might be configured so that the trajectory of any selected point of optical diffuser 130 is confined within a rectangle having a side of about 1 mm. The planar trajectory might be further configured to have one or more linear portions, each of which produces a translation of optical diffuser 130 in the corresponding direction. The trajectory might similarly have one or more curved portions, each of which produces a movement of optical diffuser 130 that can be decomposed into a translational movement component and a rotational movement component having its rotation axis substantially parallel to the Y axis. In one embodiment, optical diffuser 130 might be configured to move along a three-dimensional trajectory. It is preferred that this three-dimensional trajectory has a substantial portion that produces a movement component that is parallel to the XZ plane.

The overall size of projector 100 is controlled by the relative orientation and position of its various components and their shapes and sizes. To make projector 100 mountable on a hand-held portable electronic device, at least one dimension of the projector, e.g., the Z dimension, may be smaller than, e.g., about 10 mm. However, the above-described optical configuration of projector 100 imposes a certain limit on the minimum size of projection lens 160. The embodiment of projector 100 that is described in the next paragraph provides exemplary embodiments that may be preferable for such hand-held portable applications.

In one embodiment, optical diffuser 130 is designed to produce an anisotropic angular distribution. For example, optical diffuser 130 can be designed so that the angular spread along the vertical (e.g., Z) direction is narrower (e.g., by a factor of two or more) than the angular spread along the horizontal (e.g., X) direction. Because the height (i.e., the Z dimension) of projection lens 160 is directly related to the width (or range) of the angular distribution in the vertical direction and the length of the effective optical path between optical diffuser 130 and the projection lens, the reduced width of that angular distribution can be exploited to reduce the Z-direction size (or height) of the projection lens. In one embodiment, optical diffuser 130 is designed and configured to enable the use of projection lens 160 having a height that is smaller than about 10 mm.

Figure 2:
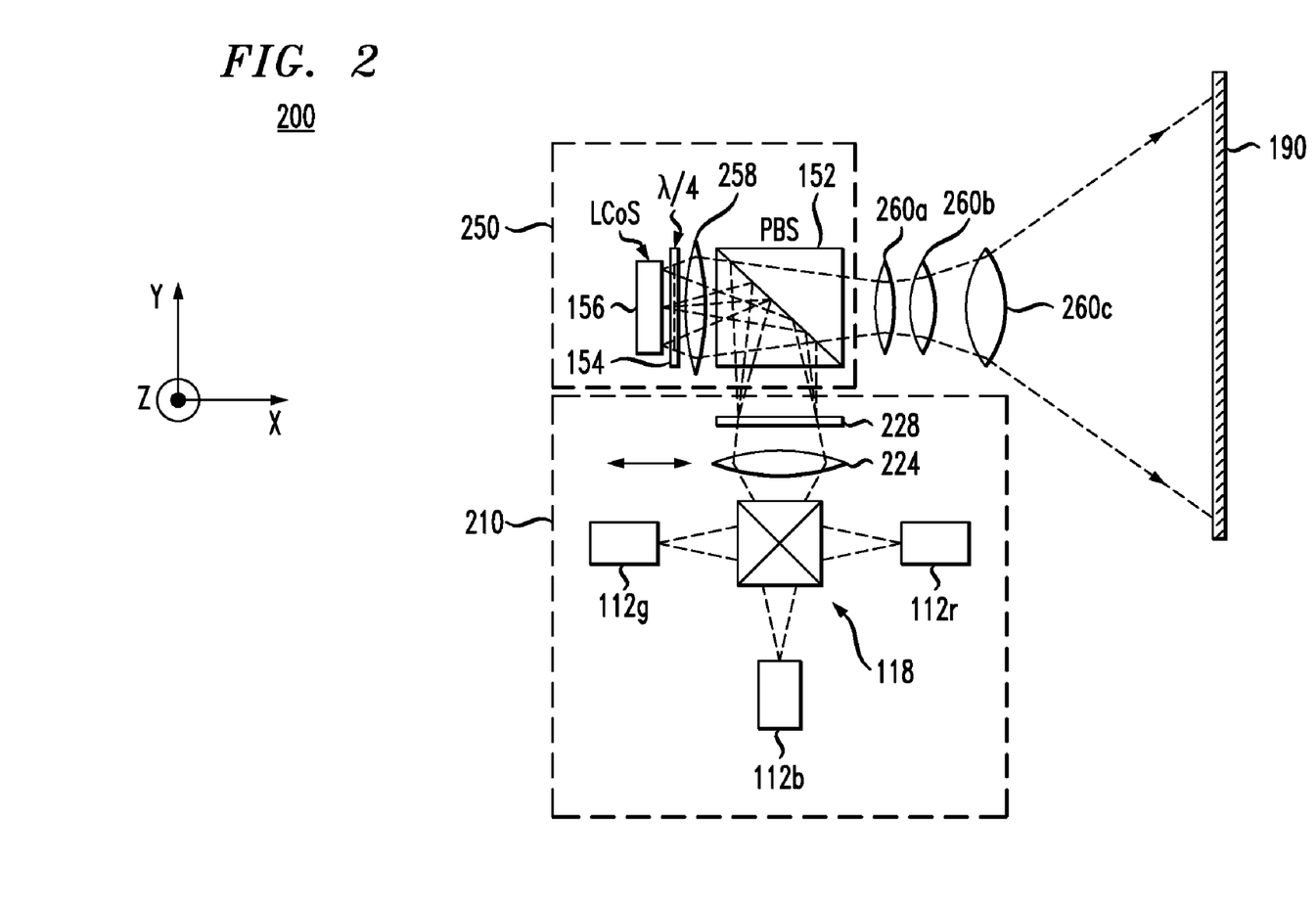
FIG. 2 shows a top view of a projector according to another embodiment of the invention.

FIG. 2 shows a top view of a projector 200 according to another embodiment of the invention. Projector 200 has a light source 210 and a modulator section 250 that employ many of the same elements as light source 110 and modulator section 150, respectively, of projector 100. The description of those elements is not repeated below. The description that follows focuses primarily on the differences between (i) light sources 210 and 110 and (ii) modulator sections 250 and 150.

In light source 210, each of lasers 112r, 112g, and 112b applies to color combiner 118 a corresponding diverging beam because, unlike light source 110, light source 210 does not employ collimating lenses analogous to collimating lenses 114r, 114g, and 114b (see FIGS. 1 and 2). Color combiner 118 directs each of the diverging beams to a lens 224. Lens 224 is adapted to transform each of the received diverging beams into a corresponding converging beam. En route to SLM 156 of modulator section 250, the light of this converging beam encounters two beam-shaping elements, i.e., an optical diffuser 228 located in light source 210 and an optional field lens 258 located in modulator section 250. Lens 224 is configured so that, in the absence of those beam-shaping elements, the output apertures of lasers 112r, 112g, and 112b would have been imaged onto a middle portion (e.g., near the center) of the active area of SLM 156.

Optical diffuser 228 is adapted to perform two functions that are analogous to the two corresponding functions of optical diffusers 122 and 130 (FIG. 1). More specifically, optical diffuser 228 is adapted to (1) transform a beam having a generally circular or oval cross section into a beam having a generally rectangular cross section of a shape corresponding to that of the active area of SLM 156 and (2) homogenize the intensity distribution within the resulting beam. In the course of performing these functions, optical diffuser 228 alters the degree of convergence of the optical beam transmitted therethrough. More specifically, for each received optical ray, optical diffuser 228 introduces a certain angular spread, e.g., as indicated by the corresponding dotted lines in FIG. 2. The above-cited U.S. Patent Application No. 20020034710 and U.S. Pat. No. 7,307,786 disclose how to make and use an optical diffuser that can serve as optical diffuser 228.

In FIG. 2, optical diffuser 228 is illustratively shown downstream from lens 224. In an alternative embodiment, optical diffuser 228 can be placed upstream from lens 224. In one embodiment, an optical diffuser suitable for use as optical diffuser 228 can be purchased from the above-mentioned RPC Photonics, Inc.

The combined effect of lens 224 and optical diffuser 228 is to produce substantially uniform illumination intensity over the substantially rectangular active area of SLM 156. The illuminated area (light spot) created by light source 210 at SLM 156 is slightly (e.g., 10%) bigger in area than the active area of the SLM and has a rectangular shape generally corresponding to that of the active area. Due to the above-described configuration of lens 224 the illuminated area has relatively sharp edges (i.e., the transition region between illuminated and non-illuminated areas is relatively narrow, e.g., the light intensity drops by about 90% over a distance that is between about 1% and about 10% of the linear size of the illuminated area). Each pixel of SLM 156 in projector 200 receives illumination having an angular distribution related to (1) the divergence angle(s) of the light emitted by lasers 112r, 112g, and 112b, (2) the magnification factor introduced by lens 224, and (3) the angular spread introduced by optical diffuser 228. In various embodiments, these parameters can be selected to produce at SLM 156 an angular distribution width that ranges from about 2 degrees to about 10 degrees.

Projector 200 has a projection lens 260 that is generally analogous to projection lens 160 of projector 100 (FIG. 1). However, the presence of field lens 258 can be used to alleviate certain design constraints on projection lens 260, such as the angle of acceptance constraint. More specifically, without field lens 258, the lateral size of projection lens 260 tends to be relatively large because the light directed toward the projection lens has a relatively large range of angles. The presence of field lens 258 reduces that range, which can be used to either reduce the lateral size of projection lens 260 or increase the amount of light relayed by the projection lens from SLM 156 to the image formed on screen 190. With the use of lens 258, projection lens 260 can be a telecentric lens (i.e., a lens for which the chief rays are parallel to the optical axis of the lens). One skilled in the art will appreciate that the use of a telecentric projection lens might be advantageous, for example, because telecentric lenses help to reduce vignetting and color crosstalk in the projected images and are capable of supporting higher resolution and transmitting more light than conventional photographic lenses. In addition, the telecentricity of projection lens 260 can be used to reduce its size.

When all optical elements in projector 200 are stationary (not moving with respect to one another), a pixel of SLM 156 receives illumination having a specific phase relationship between the light rays having different incident angles. However, this phase relationship changes as a function of the pixel's position within the illuminated area produced at SLM 156 by light source 210. Projector 200 is designed to exploit this relative phase variation to produce speckle reduction in the projected image as further described below.

In one embodiment, lens 224 is adapted to move with respect to optical diffuser 228 and SLM 156, e.g., to oscillate perpendicular to the lens'optical axis as indicated by the double-headed arrow in FIG. 2. This motion of lens 224 produces a lateral motion of the illuminated area (light spot) produced at SLM 156 by light source 210. The amplitude of this motion is preferably selected so that the active area of SLM 156 remains enclosed within the illuminated area. More specifically, the illuminated area remains on the active portion of the SLM 156 and the boundary of the illuminated area stays outside of the active portion of the SLM. At a given pixel of SLM 156, the lateral motion of the illuminated area imposes a temporal modulation on the relative phases of the light rays incident on a pixel with different incident angles. If the frequency of this temporal modulation is sufficiently high, e.g., higher than the flicker fusion rate, then the appearance of speckle in the projected image may be reduced.

One skilled in the art will appreciate that other types of periodic or non-periodic motion can of lens 224 can also reduce speckle in the projected image. For example, lens 224 can be configured to move along a planar trajectory that is parallel to the XZ plane. The planar trajectory might be configured so that the trajectory of any selected point of lens 224 is confined within a rectangle having a side of about 1 to 3 mm. The planar trajectory might be further configured to have one or more linear portions, each of which produces a corresponding translation of lens 224. The trajectory might similarly have one or more curved portions, each of which produces a movement of lens 224 that can be decomposed into a translational movement component and a rotational movement component having its rotation axis substantially parallel to the Y axis. In one embodiment, lens 224 might be configured to move along a three-dimensional trajectory. It is preferred that this three-dimensional trajectory has a substantial portion that produces a movement component that is parallel to the XZ plane.

In one embodiment, each of lasers 112r, 112g, and 112b in light source 210 is implemented as a semiconductor laser diode or diode-pumped solid state laser. As known in the art, a typical edge-emitting semiconductor laser diode emits a cone of light having a generally oval cross section. In light source 210, the semiconductor laser diodes (lasers 112r, 112g, and 112b) are oriented so that the short axis of each respective oval is substantially parallel to the Z axis while the long axis of the oval is parallel to the XY plane. As a result, the optical beam received by SLM 156 in modulator section 250 has an anisotropic angular distribution, with the vertical or Z-direction angular spread being narrower than the horizontal angular spread, i.e., the spread in the X-Y plane. As already explained above in reference to FIG. 1, the height (i.e., the Z dimension) of the projection lens (in this case, projection lens 260) is related to the vertical angular spread. Thus, the relatively small value of that angular spread can be exploited in projector 200 to enable the projector to operate with projection lens 260 having a relatively small height. In one embodiment, projector 200 employs lasers 112r, 112g, and 112b whose emission patterns enable the use of projection lens 260 having a height that is smaller than about 10 mm.

In another embodiment, each of lasers 112r, 112g, and 112b in light source 210 emits a cone of light having a generally circular cross section. However, optical diffuser 228 is designed to impose an anisotropic angular distribution so that the angular spread in the vertical (Z) direction is narrower than the angular spread in the horizontal (X) direction. The relatively small value of the vertical angular spread enables projector 200 to operate with projection lens 260 having a height smaller than about 10 mm.

Comparing light sources 210 (FIG. 2) and 110 (FIG. 1), one finds that light source 210 has fewer optical elements. This property of light source 210 enables it to have a smaller size than comparably implemented light source 110. One skilled in the art will appreciate that the most significant size difference between light sources 210 and 110 is in the Y dimension. Although, compared to modulator section 150 of projector 100, modulator section 250 of projector 200 optionally has an extra element, i.e., field lens 258, the additional space that is needed to accommodate that lens is insignificant because a relatively simple thin lens is capable of providing appropriate performance characteristics in that position. Furthermore, for the reasons similar to those described above, certain embodiments of projector 100 might have a field lens analogous to lens 258. In either case, projector 200 can generally be implemented to have a smaller overall footprint than that of projector 100.

Figure 3:
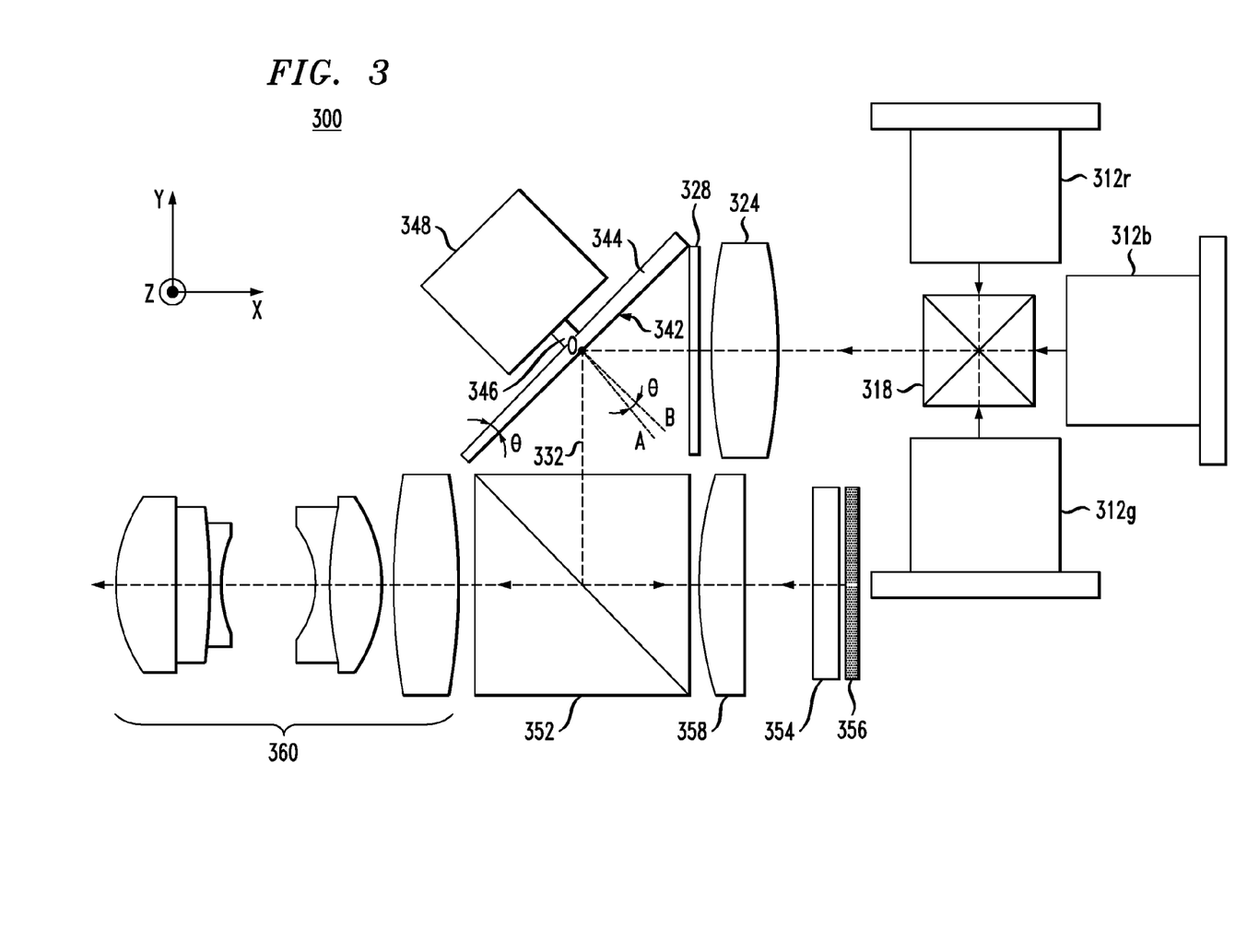
FIG. 3 shows a top view of a projector according to yet another embodiment of the invention.

FIG. 3 shows a top view of a projector 300 according to yet another embodiment of the invention. Projector 300 is generally analogous to projector 200 (FIG. 2), and analogous elements of the two projectors are designated with labels having the same last two digits. Main differences between projectors 300 and 200 are described in more detail below.

One difference between projectors 300 and 200 is in the manner of creating at the SLM, for speckle mitigation purposes, the lateral motion of the illuminated area produced by the corresponding light source. More specifically, projector 300 has a mirror 342 that optically couples, via other optical elements, optical diffuser 328 and SLM 356. Mirror 342 is formed by depositing a reflecting (e.g., metal) layer onto a side of a wedge 344 (a tapered plate, with the taper resulting in varying thickness across the plate). Wedge 344 is mounted onto a rotor 346 of a motor 348, with the back side of the wedge (i.e., the side opposite to the side having mirror 342) being orthogonal to the rotation axis (labeled OB in FIG. 3) of the rotor. Due to this geometry, the normal (labeled OA in FIG. 3) to mirror 342 and the rotation axis of rotor 346 have angle θ between them. Note that angle θ has about the same value as the wedge angle, i.e., the angle between the back side of wedge 344 and the plane of mirror 342. In one embodiment, angle θ is between about 1 degree and about 10 degrees.

When motor 348 is turned ON, it rotates rotor 346, thereby causing the normal to mirror 342 to precess about the rotation axis. This precession causes a corresponding precession in the propagation direction of optical beam 332 directed by mirror 342 toward PBS 352. The precession of optical beam 332 causes the illuminated area created by that beam at SLM 356 to move laterally along a circular trajectory. The diameter of this circular trajectory is preferably selected so that the active area of SLM 356 remains enclosed within the illuminated area, i.e., the illuminated area remains on the active portion of SLM 356 and the boundary of the illuminated area stays outside of the active portion of the SLM. At a given pixel of SLM 356, this lateral motion imposes a temporal modulation of the relative phases of the light rays having different incident angles. If the rotation speed of motor 348 is sufficiently high, then the appearance of speckle in the projected image can be reduced because the phase modulation is able to reduce (or preferably destroy) on the applicable time scale the spatial coherence of light received at the pixel and suppress the interference effects that give rise to speckle. Note that lens 324 in projector 300 may be movable in a manner similar to the movement of lens 224 in projector 200 or may be stationary.

Figure 4:
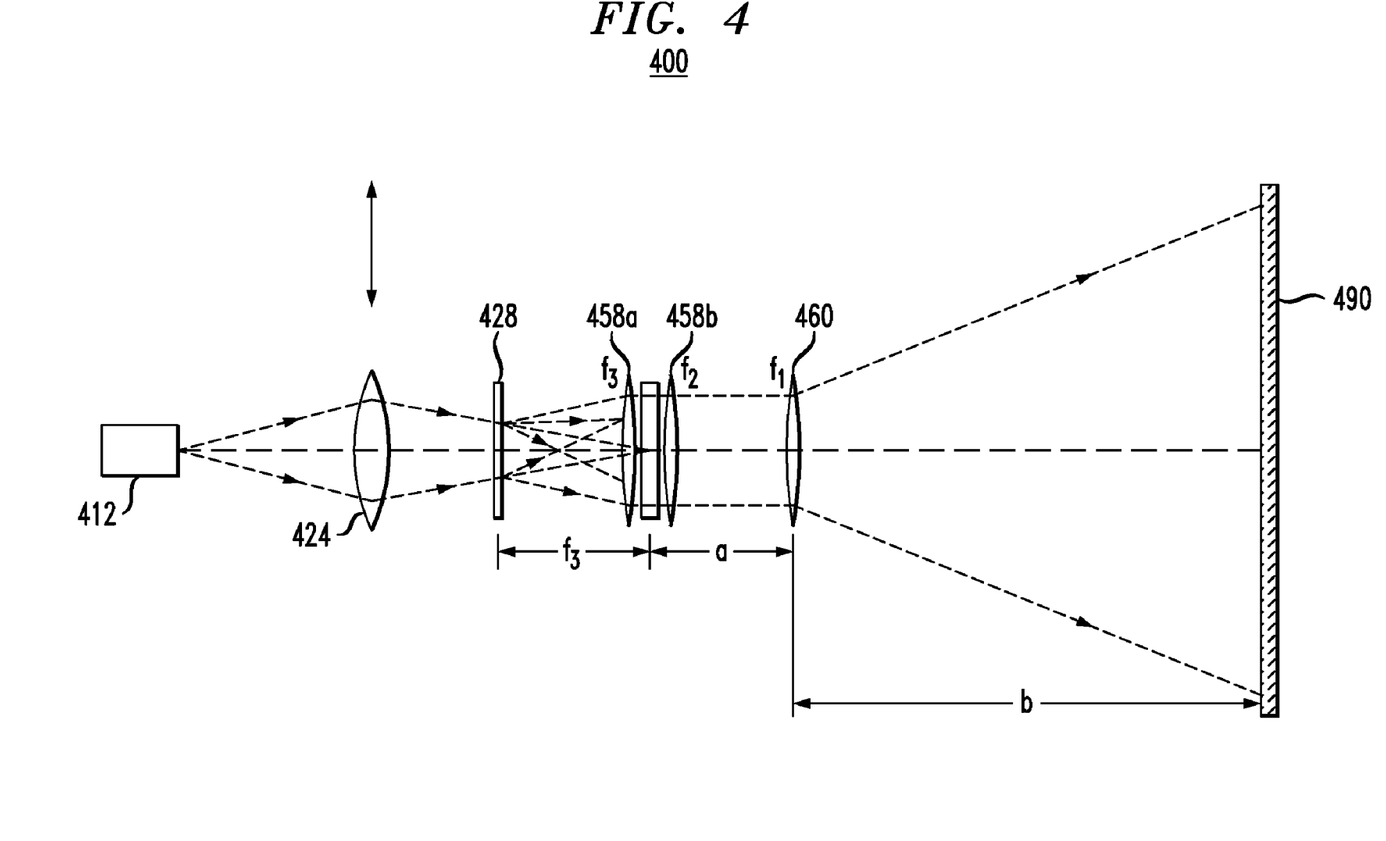
FIG. 4 shows a top view of a projector according to yet another embodiment of the invention.

FIG. 4 shows a top view of a projector 400 according to yet another embodiment of the invention. Projector 400 is generally analogous to projector 200 (FIG. 2), and analogous elements of the two projectors are designated with labels having the same last two digits. Main differences between projectors 200 and 400 are described in more detail below.

Projectors 200 and 400 can be viewed as representing "folded" and "unfolded" configurations, respectively, of the same basic optical arrangement. The folded optical arrangement of projector 200 has SLM 156 that operates in reflection. As a result, field lens 258 in projector 200 is traversed two times as light travels to and from SLM 156, respectively. In contrast, SLM 456 used in projector 400 operates in transmission. As a result, to implement the same optical functionality, projector 400 employs two instances of a field lens, i.e., lenses 458a-b. Lenses 458a-b in projector 400 perform optical functions similar to those performed by lens 258 in projector 200 before and after the light is reflected by SLM 156, respectively. Note that, due to its transmission configuration, projector 400 does not have to use a PBS similar to PBS 152 or a quarter-wave plate similar to quarter-wave plate 154 of projector 200. A suitable LCOS SLM that can be used as SLM 456 is manufactured by SEIKO EPSON Corporation and is commercially available as part of Multimedia Projector Model EMP-83/822.

Projector 400 is illustratively shown as having a single laser 412 and, as such, operates as a monochrome projector. Projector 400 might be advantageous for certain portable applications because it has a relatively narrow elongated footprint and, as such, is well suited for being incorporated into a relatively narrow, pen-like device similar to a conventional laser pointer. In an alternative embodiment, more lasers (colors) can be added to projector 400, e.g., using an X-cube as shown in FIGS. 1-2, to enable the projector to project multicolored images.

Speckle mitigation in projector 400 can be enabled by making lens 424 movable, e.g., as indicated by the double-headed arrow in FIG. 4. This motion of lens 424 produces a lateral motion on the surface of SLM 456 of the illuminated area produced by laser 412. At a given pixel of SLM 456, this lateral motion imposes a temporal modulation on the relative phases of the light rays having different incident angles. If the frequency of this temporal modulation is sufficiently high, then the amount of speckle in the image projected onto screen 490 is reduced. One skilled in the art will appreciate that other types of periodic or non-periodic motion can similarly be imposed onto lens 424 to reduce speckle in the projected image.

In one embodiment, the respective focal lengths ($f_1$, $f_2$, $f_3$) and positions of lenses 458a-b and 460 are chosen as indicated in FIG. 4. More specifically, lenses 458a-b are placed in close proximity to SLM 456. Optical diffuser 428 and projection lens 460 are placed at distances $f_3$ and a, respectively, from SLM 456 at opposite sides of the SLM. Projection screen 490 is placed at distance b from lens 460, where $a=1/(1/f_1+1/b)$. This optical configuration enables projection lens 460 to be a telecentric lens, certain benefits of which have already been explained above.

Figure 5:
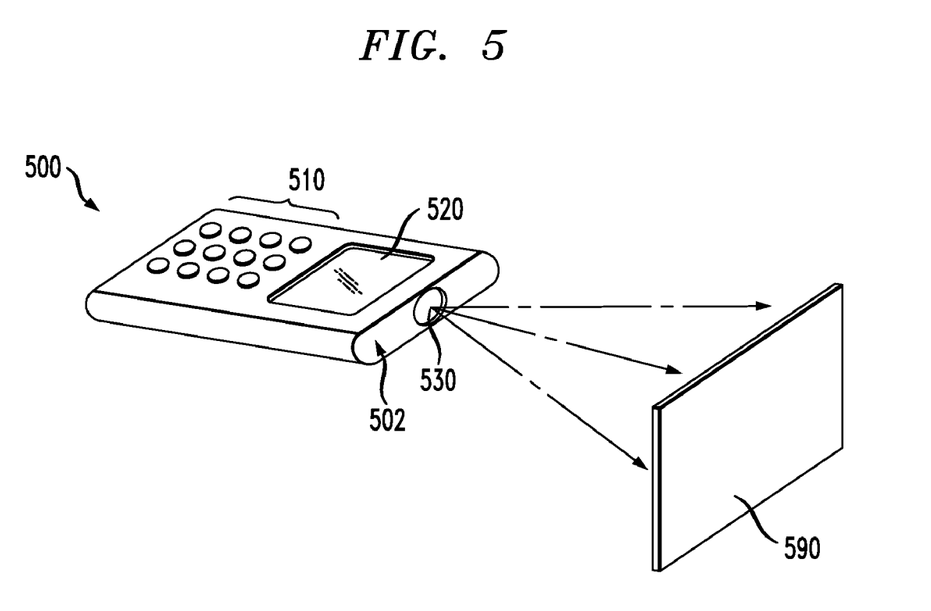
FIG. 5 shows a three-dimensional perspective view of a hand-held electronic device according to one embodiment of the invention.

FIG. 5 shows a three-dimensional perspective view of a hand-held electronic device 500 according to one embodiment of the invention. In various embodiments, device 500 can be a cell phone, PDA, media player, etc. Device 500 has a set of control keys 510 and a relatively small regular display screen 520. A narrow terminal side (edge) of device 500 has an opening 530 that serves as an optical output port for a projector built into the device. In various embodiments, device 500 can incorporate one of projectors 100, 200, 300, and 400. In FIG. 5, the projector of device 500 is illustratively shown as projecting a relatively large image onto a piece 590 of white paper.

Various embodiments described herein may use optical projectors, multi-color light sources, speckle reduction methods and structures, and/or spatial light modulators (SLMs) described in: U.S. patent application Ser. No. 11/713,207 filed Mar. 2, 2007, by Randy C. Giles et al.; U.S. patent application Ser. No. 11/681,376 filed Mar. 2, 2007, by Vladimir A. Aksyuk et al.; U.S. patent application Ser. No. 11/713,155 filed Mar. 2, 2007, by Vladimir A. Aksyuk et al.; and U.S. patent application Ser. No. 11/713,483 filed Mar. 2, 2007, by Gang Chen et al. and/or may be used in optical projectors and optical image formation methods described in these patent applications. These four patent applications are incorporated herein by reference in their entirety.

While this invention has been described with reference to illustrative embodiments, this description is not intended to be construed in a limiting sense. For example, the optical functions of optical diffuser 228 and lens 224 can be integrated into a substantially monolithic single optical element. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

Although the elements in the following method claims, if any, are recited in a particular sequential order, unless the claim recitations otherwise imply a particular order for implementing some or all of those elements, those elements are not necessarily intended to be limited to being implemented in that particular order.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same remarks apply to the term "implementation."

Throughout the detailed description, the drawings are not to scale and are illustrative and, thus, explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the "length" and "width" lie in a horizontal plane, but would be horizontal where the "length" and "width" lie in a vertical plane, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. An optical device for projecting an image on a viewing screen, the optical device comprising:
   a spatial light modulator (SLM) having a plurality of pixels adapted to modulate a received illumination light beam with a spatial pattern to form said image; and
   an optical diffuser located along an optical path between a laser and the SLM and adapted to transmit light generated by the laser to produce said illumination light beam at the SLM so that, at each pixel of the plurality, the illumination light beam has light rays corresponding to a range of incident angles, wherein:
   the optical device is adapted to achieve a motion of the illumination light beam across the SLM; and
   at each pixel of the plurality, said motion of the illumination light beam across the SLM changes relative optical phases of the light rays having different incident angles.

2. The invention of claim 1, further comprising a lens located along said optical path and adapted to move to produce said motion of the illumination beam.

3. The invention of claim 2, wherein the lens is configured to image an output aperture of the laser onto the SLM.

4. The invention of claim 2, wherein the lens and the optical diffuser are implemented as a monolithic optical element.

5. The invention of claim 1, further comprising a minor located along said optical path and adapted to move to achieve said motion of the illumination beam.

6. The invention of claim 5, wherein the minor is adapted to rotate about a rotation axis that is not parallel to a normal to the mirror.

7. The invention of claim 6, further comprising a wedge, wherein the minor is one surface of the wedge.

8. The invention of claim 1, wherein the SLM is adapted to modulate light transmitted therethrough.

9. The invention of claim 1, wherein the optical device further comprises:
   a polarization beam splitter (PBS) located on an optical path between the optical diffuser and the SLM; and
   a quarter-wave plate located on an optical path between the PBS and the SLM, wherein:
   the PBS is adapted to direct the light transmitted through the optical diffuser to the SLM;
   the SLM is adapted to impart said spatial modulation pattern on the light received from the PBS and is further adapted to direct a spatially modulated beam back to the PBS.

10. The invention of claim 1, wherein:
    the SLM is further adapted to modulate a light beam from a second laser with a corresponding spatial pattern;
    the two lasers are adapted to emit light of different colors; and
    the optical device is adapted to time-division multiplex transmission of the light of the two colors to the SLM.

11. The invention of claim 10, further comprising a color combiner adapted to direct the light emitted by each of the two lasers through the optical diffuser.

12. The invention of claim 1, further comprising said laser, wherein the laser is adapted to emit light having different angular spreads along different axes orthogonal to an emission axis of the laser.

13. The invention of claim 1, wherein the optical diffuser is adapted to introduce into light transmitted therethrough different amounts of angular spread along different directions.

14. The invention of claim 1, wherein the optical diffuser is adapted to change a cross section of a light beam applied thereto from substantially circular or oval to substantially rectangular.

15. An optical device for projecting an image on a viewing screen, the optical device comprising:
    a spatial light modulator (SLM) adapted to modulate a coherent illumination beam with a spatial pattern; and
    an optical diffuser located along an optical path that said coherent illumination beam follows prior to being intercepted by the SLM, wherein:
    the optical diffuser is adapted to introduce one angular spread into light transmitted therethrough along a first direction and a different angular spread into said transmitted light along a different second direction; and
    the optical diffuser is adapted to move with respect to a surface of the SLM.

* * * * *